United States Patent Office 2,804,455
Patented Aug. 27, 1957

2,804,455

MONOAZO DYESTUFFS AND THEIR METAL COMPLEX COMPOUNDS

Alfons Dorlars, Leverkusen-Schlebusch, and Otto Bayer and Edgar Enders, Leverkusen-Bayerwerk, Germany, assignors to Farbenfabriken Bayer Aktiengesellschaft, Leverkusen, Germany, a corporation of Germany No Drawing. Application May 3, 1955,
Serial No. 505,838

Claims priority, application Germany May 8, 1954

7 Claims. (Cl. 260—146)

The present invention relates to monoazo dyestuffs, their metal complex compounds and to methods of making the same; more particularly it relates to monoazo dyestuffs corresponding to the following formula:

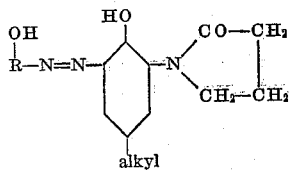

alkyl

In this formula R stands for a radical of the benezene series being free from sulfonic and carboxylic acid groups and bearing the hydroxy group in o-position to the —N=N-bridge. The invention further relates to metal complex compounds of these monoazo dyestuffs.

The new monoazo dyestuffs can be obtained by coupling the diazo compounds of o-hydroxy-aminobenzenes with components of the following formula:

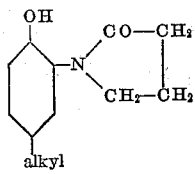

alkyl which couple in o-position to the hydroxy group.

The monoazo dystuffs thus obtained can be converted into their metal complex compounds by a treatment with metal yielding agents in usual manner either on the fibre or in the dye bath or in substance. The dyestuffs are e. g. well suited for the monochrome process.

The conversion of the new dyestuffs in their metal complex compounds, preferably into their chromium complex compounds, may be carried out in admixture with other metallizable monoazo dyestuffs.

The manufacture of metal containing dyestuffs in substance takes place in the usual manner, e. g. in the absence or presence of complex forming compounds such as oxalic acid, salicylic acid, etc.

Suitable diazo compounds for the production of the new dyestuffs are e. g. 1-amino-2-hydroxy-5-chlorobenzene, 1-amino-2-hydroxy-3,5-dichlorobenzene, 1-amino-2-hydroxy-5-nitrobenzene, 1 - amino-2-hydroxy-3-chloro-5-nitrobenzene, 1 - amino-2-hydroxy-3-nitrobenzene-5-sulfonamide, 1 - amino-2-hydroxy-3-nitrobenzene-5-methylsulfone, etc.

The 1 - hydroxy - 2 - [pyrrolidonyl(1′)]-4-alkylbenzenes, used as coupling components in the present process may contain straight-chained, branched or cyclic alkyl groups with 1 to 8 carbon atoms. They are obtained by the reaction of 1-hydroxy-2-amino-4-alkylbenzenes with γ-butyrolactone, as described in "Berichte der Deutschen Chemischen Gesellschaft," 69, page 2727.

The coupling process is carried out in water or organic solvents as dimethyl formamide, in the presence of acid binding materials as soda lye, ammonia, soda, milk of lime, magnesium carbonate or pyridine.

The new monoazo dyestuffs yield on wool, afterchromed, brownish-red to brown dyeings of very good fastness to light and good fastness to wear and tear and good fastness to processing.

The dyestuffs metallized in substance dye wool and silk as well as wool-like synthetic fibres from superpolyamides, superpolyurethanes and casein fibres as well as leather from neutral or weakly acid bath; they possess excellent leveling and penetrating properties. In these properties they exceed other comparable known dyestuffs, which contain instead of the pyrrolidine group e. g. an acetylamino group. The dyeings thus obtained possess a very good fastness to light and good fastness to wear and tear and to processing.

The new monoazo dyestuffs which are chromed in admixture with other monoazo dyestuffs show similar general and fastness properties.

The following examples illustrate the invention, without, however, limiting it thereto; the parts being by weight:

Example 1

15.4 parts of 1-amino-2-hydroxy-5-nitrobenzene are indirectly diazotized in usual manner and the formed diazo compound salted out and filtered with suction. The separated diazo compound is gradually added with stirring to a solution of 19.2 parts of 1-hydroxy-2-(N-pyrrolidonyl)-4-methylbenzene, 4 parts of sodium hydroxide in 350 parts of pyridine and 40 parts of water which is cooled to a temperature of —10° C. to —5° C. After coupling is finished the pyridine is distilled off in vacuo and the formed monoazo dyestuff corresponding to the following general formula:

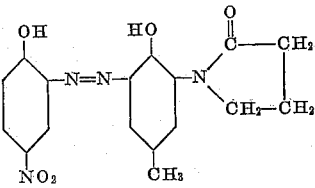

is purified by dissolving it in water and salting out. A black powder is obtained which dyes wool by the monochrome process in reddish-brown shades.

Example 2

35.6 parts of the monoazo dyestuff, described in Example 1, are dissolved in 350 parts of hot water and 40 parts of 10 per cent soda solution. 200 parts of an chromium-ammonium-oxalate solution which corresponds to 26 parts of chrome per litre, are dropwise added to the solution of the monoazo dyestuff with stirring at a temperature of 95–100° C. When the reaction is finished the chrome containing monoazo dyestuff is filtered with suction and dried. It represents a black powder which dyes wool from a neutral or weakly acid bath in reddish-brown shades of good fastness properties.

A chromium complex dyestuff of similar properties is obtained, if a solution of 7.9 parts of sodium bichromate and 6 parts of 40 percent sodium hydroxide in 30 parts of water together with a solution of 10 parts of commercial glucose in 40 parts of water is added dropwise with stirring to a solution of 35.6 parts of the aforesaid dyestuff in 250 parts of water and 12 parts of 40 percent sodium hydroxide at a temperature of 95° C.

Example 3

23.3 parts of 1-amino-2-hydroxy-3-nitrobenzene-5-sulfonamide are diazotized with 6.9 parts of sodium nitrite in usual manner and combined with 19.2 parts of 1-hydroxy - 2 - (N-pyrrolidonyl)-4-methylbenzene as described in Example 1. After distilling off the pyridine the dyestuff is redissolved from water. A monoazo dyestuff of the following formula is obtained:

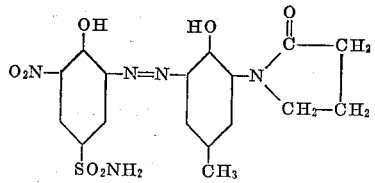

It represents a black-brown powder which dyes wool by the monochrome process in reddish dark-brown shades of good fastness to light and good fastness to wet-treatment.

*Example 4*

15.4 parts of 1-amino-2-hydroxy-5-nitrobenzene are diazotized as described in Example 1. The separated diazo compound is added to a solution of 23.3 parts of 1-hydroxy-2-(N-pyrrolidonyl)-4-tertiary-butyl-benzene, 4 parts of sodium hydroxide and 8 parts of soda in 350 parts of pyridine and 50 parts of water. The further process is the same as described in Example 1. The dyestuff thus obtained corresponds to the following formula:

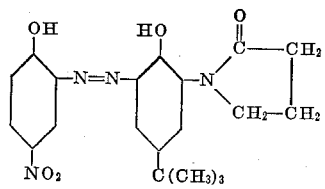

and forms, after drying, a dark powder which dyes wool by the monochrome process in dark red-brown shades of excellent fastness properties.

If the dyestuff is chromed as described in Example 2, a chrome complex monoazo dyestuff is obtained which dyes wool from a neutral bath in level red-brown shades of good fastness to light and very good fastness to wet-treatment.

The 1 - hydroxy - 2-(N-pyrrolidonyl)-4-tertiary-butyl-benzene can be obtained by reacting 1-hydroxy-2-amino-4-tertiary-butyl-benzene with γ-butyrolactone at a temperature of about 250° C. It forms colorless needles melting at 151° C.

We claim:

1. Dyestuffs selected from the group consisting of monoazo dyestuffs corresponding to the general formula

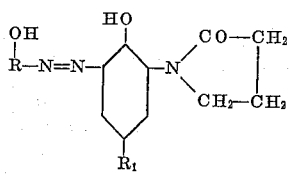

wherein R stands for a radical of the benzene series being free from sulfonic and carboxylic acid groups and bearing the hydroxy group in o-position to the —N=N-bridge and $R_1$ is an alkyl group having 1–8 carbon atoms and the chromium complex compounds thereof.

2. Dyestuffs selected from the group consisting of monoazo dyestuffs corresponding to the general formula

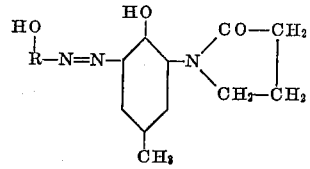

wherein R stands for a radical of the benzene series being free from sulfonic and carboxylic acid groups and bearing the hydroxy group in o-position to the —N=N-bridge and the chromium complex compounds thereof.

3. A dyestuff selected from the group consisting of a monoazo dyestuff corresponding to the formula

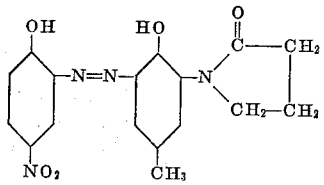

and the chromium complex compound thereof.

4. A dyestuff selected from the group consisting of the monoazo dyestuff corresponding to the formula:

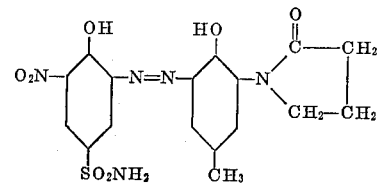

and the chromium complex thereof.

5. A dyestuff selected from the group consisting of a monoazo dyestuff corresponding to the formula

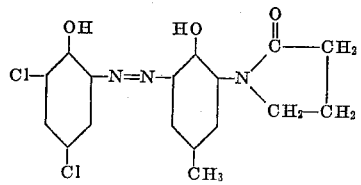

and the chromium complex compound thereof.

6. A dyestuff selected from the group consisting of a monoazo dyestuff corresponding to the formula

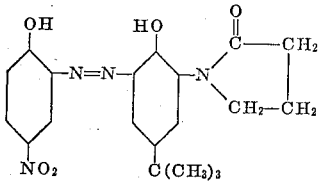

and the chromium complex compound thereof.

7. A dyestuff selected from the group consisting of a monoazo dyestuff corresponding to the formula

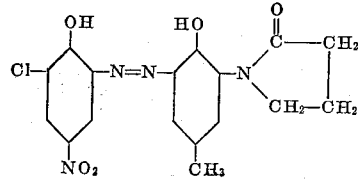

and the chromium complex compound thereof.

No references cited.